US006430235B1

(12) United States Patent
O'Shea et al.

(10) Patent No.: US 6,430,235 B1
(45) Date of Patent: Aug. 6, 2002

(54) NON-DATA-AIDED FEEDFORWARD TIMING SYNCHRONIZATION METHOD

(75) Inventors: Deirdre O'Shea; Ismail Lakkis; Masood Tayebi, all of San Diego, CA (US)

(73) Assignee: Wireless Facilities, Inc., San Diego, CA (US)

( * ) Notice: Subject to any disclaimer, the term of this patent is extended or adjusted under 35 U.S.C. 154(b) by 0 days.

(21) Appl. No.: 09/186,752

(22) Filed: Nov. 5, 1998

(51) Int. Cl.[7] .................................................. H04L 27/14

(52) U.S. Cl. ........................ 375/326; 375/355; 375/371; 370/516

(58) Field of Search ............................... 375/326, 327, 375/344, 354, 355, 371; 370/503, 516, 517, 527

(56) References Cited

U.S. PATENT DOCUMENTS

| 3,943,346 A | 3/1976 | Urkowitz et al. ............ 235/152 |
| 4,020,332 A | 4/1977 | Crochiere et al. ........... 235/152 |
| 4,471,480 A | 9/1984 | Haussmann et al. | |

(List continued on next page.)

FOREIGN PATENT DOCUMENTS

| GB | 2 213 025 A | 8/1989 |
| GB | 2 286 949 A | 8/1995 |

OTHER PUBLICATIONS

Classen, F., Meyr, H., and Sehier, P., Proc. of VTC '93, pp. 738–741, Secausus, NJ, May 18, 1993 "An all Feedforward Synchronization Unit for Digital Radio".

De Gaudenzi, R., Luise, M. and Viola, R., IEEE Transactions on Communications, vol. 41, No. 11, pp. 1760–1769, Nov. 1993 "A Digital Chip Timing Recovery Loop for Band–Limited Direct–Sequence Spread–Spectrum Signals".

(List continued on next page.)

*Primary Examiner*—Stephen Chin
*Assistant Examiner*—Dac V. Ha
(74) *Attorney, Agent, or Firm*—Knobbe, Martens, Olson & Bear LLP

(57) ABSTRACT

The present invention provides a system and method of timing estimation for use in a digital, receiver within a communication system. This method exploits the complementary information available from the use of two different nonlinearities to estimate the timing offset following asynchronous sampling of the received signal at a rate of two samples per symbol. The present method operates in a feedforward configuration thereby avoiding issues associated with feedback configurations such as hangup. The present method uses a magnitude square nonlinearity as well as a delay, complex conjugate and multiply nonlinearity to calculate the timing offset. The choice of these nonlinearities is influenced by the need for the estimator to operate in the presence of a phase offset on the received signal. Timing estimators which can tolerate the presence of a slowly varying phase offset over the observation interval on the received signal are especially important in all-digital feedforward receiver design. Separating the two sample per symbol outputs from the nonlinearities into odd and even samples provides four signals which, when suitably manipulated, yield an expression for the timing estimate. This timing offset is then fed to a timing correction unit which calculates the data samples corresponding to the sampling clock phase and removes the redundant samples. The resultant sampled signal is then forwarded to additional synchronization and functional units in the receiver. The system may be utilized in a variety of digital receivers employing CDMA, TDMA, FDMA and/or any combination of the principles of the above or other technologies.

17 Claims, 8 Drawing Sheets

U.S. PATENT DOCUMENTS

| | | | |
|---|---|---|---|
| 4,866,647 A | | 9/1989 | Farrow ..................... 364/724.1 |
| 5,255,290 A | * | 10/1993 | Anvari ......................... 375/97 |
| 5,285,480 A | | 2/1994 | Chennakeshu et al. |
| 5,361,276 A | | 11/1994 | Subramanian ................. 375/1 |
| 5,541,965 A | | 7/1996 | Daffara ....................... 375/326 |
| 5,541,966 A | * | 7/1996 | Bolla et al. ................. 375/329 |
| 5,555,247 A | | 9/1996 | Matsuoka et al. |
| 5,566,211 A | * | 10/1996 | Choi ........................... 329/304 |
| 5,802,117 A | | 9/1998 | Ghosh |
| 5,805,619 A | | 9/1998 | Gardner et al. |
| 5,854,570 A | | 12/1998 | Schmidt |
| 5,870,442 A | * | 2/1999 | Farrow ....................... 375/355 |
| 5,933,467 A | | 8/1999 | Sehier et al. |
| 5,963,603 A | * | 10/1999 | Li et al. ..................... 375/341 |
| 5,987,073 A | * | 11/1999 | Knutson ..................... 375/326 |
| 6,002,729 A | * | 12/1999 | Schimidt .................... 375/364 |
| 6,097,770 A | * | 8/2000 | Bahai et al. ................ 375/343 |
| 6,134,286 A | | 10/2000 | Chennakeshu et al. |
| 6,175,600 B1 | * | 1/2001 | Guillemain et al. ........ 375/326 |
| 6,275,548 B1 | * | 8/2001 | Wolf et al. ................. 375/355 |

OTHER PUBLICATIONS

Erup, L., Gardner, F. M. and Harris, R.A., IEEE Transactions on Communications, vol. 41, No. 6, pp. 998–1008, Jun. 1993 "Interpolation in Digital Modems–Part II: Implementation and Performance".

Gardner, F.M., IEEE Transactions on Communications, vol. 41, No. 3, pp. 501–507, Mar. 1993 "Interpolation in Digital Modems–Part 1: Fundamentals".

Gardner, F.M., IEEE Transactions on Communications, vol. 34, No. 5, pp. 423–429, May 1986 "A BPSK/QPSK Timing–Error Detector for Sampled Receivers".

Lambrette, U., Langhammer, K. and Meyr, H., IEEE GlobeCom 1996 "Variable Sample Rate Digital Feedback NDA Timing Synchronization".

Mengali, U. and D'Andrea, A., Synchronization Techniques for Digital Receivers, p. 398, 1998 "Feedforward Estimation Schemes".

Meyers, M. H. and Franks, L. E., IEEE Transactions on Communications, vol. 28, No. 8, pp. 1121–1129, Aug. 1980 "Joint Carrier Phase and Symbol Timing Recovery for PAM Systems".

Meyr, H., Moeneclaey, M and Fechtel, S.A., Digital Communication Receivers: Synchronization, Channel Estimation and Signal Processing, Proakis, J., John Wiley Publishers., pp. 289–295, 1998 "NDA Timing Parameter Estimation by Spectral Estimation".

Moeneclaey, M. and Bucket, K., Signal Processing in Telecommunications, pp. 171–182, Sep. 1995, "Timing Correction by Means of Digital Interpolation".

Morelli, M., D'Andrea A. N. and Mengali, U., IEEE Communications Letters, vol. 1, No. 3, pp. 80–82, May 1997 "Feedforward ML–Based Timing Estimation with PSK Signals".

Oerder, M. and Meyr, H., IEEE Transactions on Communications, vol. 36, No. 5, pp. 605–611, May 1988 "Digital Filter and Square Timing Recovery".

Panayirci, E. and Bar–Ness, E. Y., IEEE Transactions on Communications, vol. 44, No. 1, pp. 29–33, Jan. 1996 "A New Approach for Evaluating the Performance of a Symbol Timing Recovery System Employing a General Type of Nonlinearity".

Proakis, J. G., Digital Communications, Third Edition, Chp. 6, McGraw–Hill Publishers, pp. 333–373, and pp. 536–537 "Carrier and Symbol Synchronization".

Vesma, J., Renfors, M and Rinne, J., IEEE GlobeCom 1996 "Comparison of Efficient Interpolation Techniques for Symbol Timing Recovery".

Zhang, P., Short, R. T. and Chen, X. X., IEEE GlobeCom 1996 "Fast Timing Estimation for CDMA Waveforms in a Near–Far Environment".

* cited by examiner

NON-DATA-AIDED FEEDFORWARD TIMING SYNCHRONIZATION METHOD

BACKGROUND OF THE INVENTION

1. Field of the Invention

The invention relates to communication systems, and more particularly to an apparatus for achieving synchronization in a receiver.

2. Related Art

In synchronous digital transmission, information is conveyed by uniformly spaced pulses and the function of any receiver is to isolate these pulses as accurately as possible. However, due to the noisy nature of the transmission channel, the received signal undergoes changes during transmission and therefore, a complete estimation of certain reference parameters is necessary prior to data detection. The unknown parameters may cover such factors as the optimum sampling or the phase offset introduced in the channel or induced by the instabilities of the transmitter and receiver oscillators.

Estimation theory proposes various techniques for the estimation of these parameters; one such technique is Maximum Likelihood. However, ad-hoc techniques which are either totally unrelated to the optimum estimation derived from Maximum Likelihood or are at most loosely related, can also give excellent performance.

Generally, if the transmitter does not generate a pilot synchronization signal, the receiver must derive symbol timing from the received signal. The term symbol is used in this context to refer to transmitted signals that are phase modulated with discrete phase relationships. Both the transmitter and the receiver employ separate clocks which drift relative to each other, and any symbol synchronization technique must be able to track such drift.

Choosing the proper sampling instants is critical for reliable data detection. Failure to sample at the correct instants leads to Inter-Symbol Interference (ISI), which can be especially severe in sharply bandlimited signals. The term ISI refers to two or more symbols that are superimposed upon each other which makes phase detection of each symbol extremely difficult. Incorrect sampling implies the receiver is inadvertently sampling where the influence of the previous data symbol is still present (J. G. Proakis, "*Digital Communications,*" Third Edition, McGraw-Hill Publishers, pp. 536–537, 1995).

In a conventional digital receiver, the signal following demodulation is first passed through an anti-aliasing filter, which is used to limit the bandwidth of the received signal, and is subsequently sampled asynchronously. Asynchronous sampling implies there is no control over the instant at which the sampling of the continuous time signal occurs.

FIGS. 1-*a* and 1-*b* illustrate the concept of oversampling a continuous signal at four and two samples per symbol, respectively. The optimum sampling instants correspond to the maximum eye opening and are located approximately at the peaks of the signal pulses. FIG. 1-*a* shows that oversampling at four samples per symbol provides more information about the received signal than oversampling at two samples per symbol (FIG. 1-*b*).

The term "eye opening" refers to the amplitude variations of the signal at the output of the pulse-shaping filter. An "eye" pattern is formed by superimposing the output of the pulse-shaping filter for each symbol upon the other until the central portion takes on the shape of an "eye". This is illustrated in FIGS. 2-*a* and 2-*b* for a BPSK (Binary Phase Shift Keying) modulation scheme for high and low signal to noise conditions. Note that at high signal to noise conditions the "eye" is open, whereas at low signal to noise conditions, the "eye" is closed.

Among synchronization techniques, a distinction is made between feedforward and feedback systems. A feedback system uses the signal available at the system output to update future parameter estimates. Feedforward systems process the received signal to generate the desired estimate without explicit use of the system output.

In an error tracking feedback loop, the timing estimator constantly adjusts the phase of a local clock oscillator to minimize the phase error between the estimated and the optimum.sampling instant as illustrated in FIG. 3. In a feedforward-timing loop, as illustrated in FIG. 4, the incoming signal is sampled asynchronously and applied to a timing estimator. This timing estimate is subsequently fed to an interpolator to estimate the received signal at the instant of the estimated timing offset phase. Interpolation estimates the signal value at the optimum sampling instant using the timing phase from the timing phase estimation unit (H. Meyr, M. Moeneclaey and S. A. Fechtel, "*Digital Communication Receivers: Synchronization, Channel Estimation and Signal Processing,*" John Wiley Publishers, Chapter 9, pp. 505–532, 1998). Redundant samples are removed using a decimator. Both feedforward and feedback techniques are currently in use; however, it should be noted that there are advantages and disadvantages associated with both approaches.

Problems with feedback techniques include the length of the acquisition time, the high probability of hangup and cycle slips associated with phase locked loop (PLL) based structures, especially in the presence of channel fading. Fading occurs when signal components arriving via different propagation paths add destructively. Hangup occurs when the initial phase error of the estimator is close to an unstable equilibrium point, which can result in an extremely long acquisition time (i.e., a long time for the loop to adjust to the correct phase); in fact, the loop may never recover. Hangup is very serious as it can even occur in perfect channel conditions (H. Meyr, M. Moeneclaey and S. A. Fechtel, "*Digital Communication Receivers: Synchronization, Channel Estimation and Signal Processing,*" John Wiley Publishers, pp. 94–97, 1998). Cycle slips are very harmful to the reliability of the receiver's decisions, because a cycle slip corresponds to the repetition or omission of a channel symbol (H. Meyr, M. Moeneclaey and S. A. Fechtel, "*Digital Communication Receivers: Synchronization, Channel Estimation and Signal Processing,*" John Wiley Publishers, pp. 385–399, 1998).

These problems can be circumvented through the use of feedforward estimation. The advantages of feedforward estimation are that acquisition time is solely dependent on loop bandwidth and is not influenced by channel conditions. In addition, hangup does not occur and implementation costs are lower, as feedforward designs are more suited to VLSI (Very Large Scale Integration) implementation. Flexibility in the design of the synchronization unit has increased with the advent of increasingly powerful silicon chips.

However, feedforward techniques in the literature generally require a higher oversampling ratio than is prevalent in sampled feedback estimators (F. M. Gardner, "*A BPSK/QPSK Timing Error Detector for Sampled Receivers,*" IEEE Transactions on Communications, COM-44, pp. 399–406, March 1996), which generally require an oversampling rate of one or two samples per symbol for reliable operation. In feedforward designs, the oversampling rate is generally four or more samples per symbol (H. Meyr, M. Moeneclaey and S. A. Fechtel, "*Digital Communication Receivers: Synchronization, Channel Estimation and Signal Processing,*" John Wiley Publishers, pp. 289–295, 1998). This in turn is in contrast to analog feedback methods, which require a continuous waveform (J. G. Proakis, "*Digital Communications,*" Third Edition, McGraw-Hill Publishers, pp. 358–365, 1995). Digital synchronization methods recover timing by operating only on samples taken at a suitable rate. Digital implementation of an estimator has enormous appeal in communications technology and influences the design of all modem receivers.

There are two distinct stages involved in timing estimation: first, the estimation of the timing phase offset and second, the use of this estimate in the interpolationldecimation process. The estimated sampling instant within a symbol is the timing phase. The configuration of the feedforward timing estimator loop is very different from that of a feedback loop. FIG. 4 illustrates that, in a feedforward arrangement, sampling is asynchronous and the subsequent processing in the interpolator and decimator units must choose the optimum data samples for the received signal using an estimate of the timing offset based on the received signal samples. An algorithm is applied to estimate the timing phase in the timing phase estimation unit. What is desired is an improved timing phase estimation unit, wherein, for example, only two samples per symbol of the recovered signal are used to estimate the timing offset. Two forms of processing can be applied within the timing phase estimating unit depending on how the data present on the received signal is exploited to assist in the timing estimation. The first is data-aided (DA) estimation wherein known data within the data stream is exploited to improve the estimation performance. Alternatively, non-data-aided (NDA) estimation is possible wherein the arbitrary data is considered a nuisance parameter, which is removed by averaging the received signal over the statistics of the arbitrary data.

The received noisy signal samples contains no periodic components because the information symbols have zero mean. However, if the samples are passed through an appropriate nonlinearity, such as a square law operation, a cyclostationary process results which is observed as spectral lines in the frequency domain at multiples of the symbol rate. The phase of the spectral line at the symbol rate is related to the normalized timing offset. Exploitation of this and similar nonlinearities has been presented in the literature (M. Morelli, A. N. D'Andrea and U Mengali, "*Feedforward ML-Based Timing Estimation with PSK Signals,*" IEEE Communications Letters, 1(3): pp. 80–82, 1997; E. Panayirci and E. Y. Bar-Ness "*A New Approach for Evaluating the Performance of a Symbol Timing Recovery System Employing a General Type of Nonlinearity,*" IEEE Transactions on Communications; 44(1): pp. 29–33, 1996).

Timing estimators utilizing a nonlinearity are known as spectral line generating synchronizers. The expectation of the resulting signal at the output of the nonlinearity is a periodic signal with a period equal to the symbol rate T. This periodic signal can be composed as the sum of sinusoidal components (spectral lines) occurring at 1/T and multiples thereof. The signal at the nonlinearity output enters either a PLL or a narrowband bandpass filter. In the case of a narrowband bandpass filter tuned to the channel symbol rate 1/T, the sinusoidal component that is present at the output of the nonlinearity is isolated and serves as a clock signal for the sampling device.

An alternative to using a PLL or a narrowband bandpass filter involves evaluating the Fourier component of the spectral line occurring at the symbol rate. The accuracy of the estimate depends on the length of the observation interval over which the Fourier component is formed. The jitter on the estimate reduces as the observation interval increases. Exploitation of these and similar nonlinearities has been presented in the literature. However, these typically use a minimum of four samples per symbol. Therefore, there is a need for an estimator that has a feedforward configuration and can operate at a lower sampling rate.

If the timing estimator is among the first modules in a baseband receiver system, then the performance of the estimator should be independent of the presence of a phase offset on the sampled received signal which is deterministic or, at most, slowly varying over the observation interval.

Consequently, what is needed is to provide a timing estimation method that can give comparable performance in the presence of a slowly varying or static phase offset as alternative algorithms which require the removal of the phase offset beforehand. Timing estimation would be provided based on asynchronously sampling the pulse shaping filter output at a rate of two samples per symbol. The timing estimation would use a NDA technique and a feedforward configuration that avoids the problems associated with feedback design approaches such as hangup. The proposed estimator would employ two nonlinearities to generate spectral lines in the frequency domain with a period equal to the channel symbol rate. The phase of the spectral line generated at the symbol rate would be related to $\tau/T$, where $\tau$ is the timing offset. Two samples per symbol would provide sufficient information to isolate the timing offset as the argument of an expression formed using the outputs of the two nonlinearities. An embodiment of the estimator could then be used in conjunction with any of the established methods of timing correction available in the literature.

SUMMARY OF THE INVENTION

One aspect of the present invention includes a system and method of timing estimation for use in a digital receiver within a communication system. A timing estimation block or timing estimator is provided within a digital receiver where the inputted signal stream may be processed at two samples per symbol and the estimator operates in a feedforward manner. The invention implements an ad-hoc timing estimation technique whose performance is unaffected by the presence of a phase offset on the received signal samples. Furthermore, NDA estimation is utilized in the timing estimator.

This timing estimation method exploits the complementary information available from the use of two different nonlinearities to estimate the timing offset using two samples per symbol. The method uses a squaring nonlinearity as well as a delay, complex conjugation and multiply nonlinearity to generate the information to calculate the timing offset. Separating the two sample per symbol outputs from the two nonlinearities into odd and even samples yields four signal branches which, when suitably manipulated, give an expression for the timing estimate. This timing offset is then fed to a timing correction unit, which calculates the data samples corresponding to the sampling clock phase and removes the redundant samples. The resultant sampled signal is then forwarded to additional synchronization and functional units.

This method is provided for a variety of digital receivers employing Code Division Multiple Access (CDMA), in which a transmitted signal is spread over a band of frequencies much wider than the minimum bandwidth required to transmit the signal, Time Division Multiple Access (TDMA) where the users share the radio spectrum in the time domain, Frequency Division Multiple Access (FDMA) where a user is allocated at least one unique frequency for communication without interference with users in the same frequency spectrum, and/or any combination of the principles of the above or other technologies.

In accordance with another aspect of the invention, a digital receiver system comprises an anti-aliasing filter, a sampling unit, a filtering block, a timing estimation block, a timing correction block and additional functional blocks. The filtering block comprises a pulse-shaping filter. The timing estimation subsystem comprises a squaring nonlinearity, a delay, complex conjugation and multiply unit, two demultiplexers, two summation blocks, two subtractors and a phase calculator. The filtering block receives signals from an Intermediate Frequency (IF) block which have been demodulated to baseband. In one embodiment, these signals are sampled at the Analog to Digital Converter (ADC) with a fixed clock (Sampling Clock=46.7 MHz). It is necessary to note that the signals received by the filtering block within the digital receiver might not be sampled, and that the sampling may take place only after the filtering block. The outputted signals from the filtering block are then fed to the timing estimation subsystem for further processing. The resulting timing estimate is then fed to the timing correction unit to correctly estimate the received data stream. The output from the timing correction unit is subsequently fed to additional functional blocks for further processing.

In another aspect of the present invention there is a method of feedforward timing estimation for use in a digital receiver within a communication system, the method comprising splitting an input data stream into a first data stream and a second data stream; applying a first nonlinearity to the first data stream and a second nonlinearity to the second data stream; averaging the instantaneous values of the first nonlinearly derived data stream; averaging the instantaneous values of the second nonlinearly derived data stream; and determining a timing offset as a function of the complex components of the averaged instantaneous values.

In yet another aspect of the present invention there is a feedforward timing estimation system for use in a digital receiver within a communication system, the timing estimation system comprising a pulse-shaping filter receiving a data stream sampled at a minimum rate of two samples per symbol; a timing estimator, receiving the filtered data stream, and being capable of generating a timing offset; a processing delay, receiving the filtered data stream, and delaying the filtered data stream; and a timing correction subsystem, receiving the delayed data stream and the timing offset, and being capable of generating corrected data samples according to the timing offset.

BRIEF DESCRIPTION OF THE DRAWINGS

The above and other aspects, features and advantages of the invention will be better understood by referring to the following detailed description of the preferred embodiment, which should be read in conjunction with the accompanying drawings, in which:

FIG. 1-b is a graph illustrating the same signal as in FIG. 1-a using two samples per symbol.

FIG. 2-b is a graph illustrating the formation of an eye pattern at the output of a pulse-shaping filter for low signal to noise conditions.

DETAILED DESCRIPTION OF THE PREFERRED EMBODIMENTS

The following detailed description of the preferred embodiments presents a description of certain specific embodiments of the present invention. However, the present invention can be embodied in a multitude of different ways as defined and covered by the claims. The following description is not intended to limit the enumerated claims, but to serve as a particular example thereof. In this description, reference is made to the drawings wherein like parts are designated with like numerals throughout.

Figure 1A:
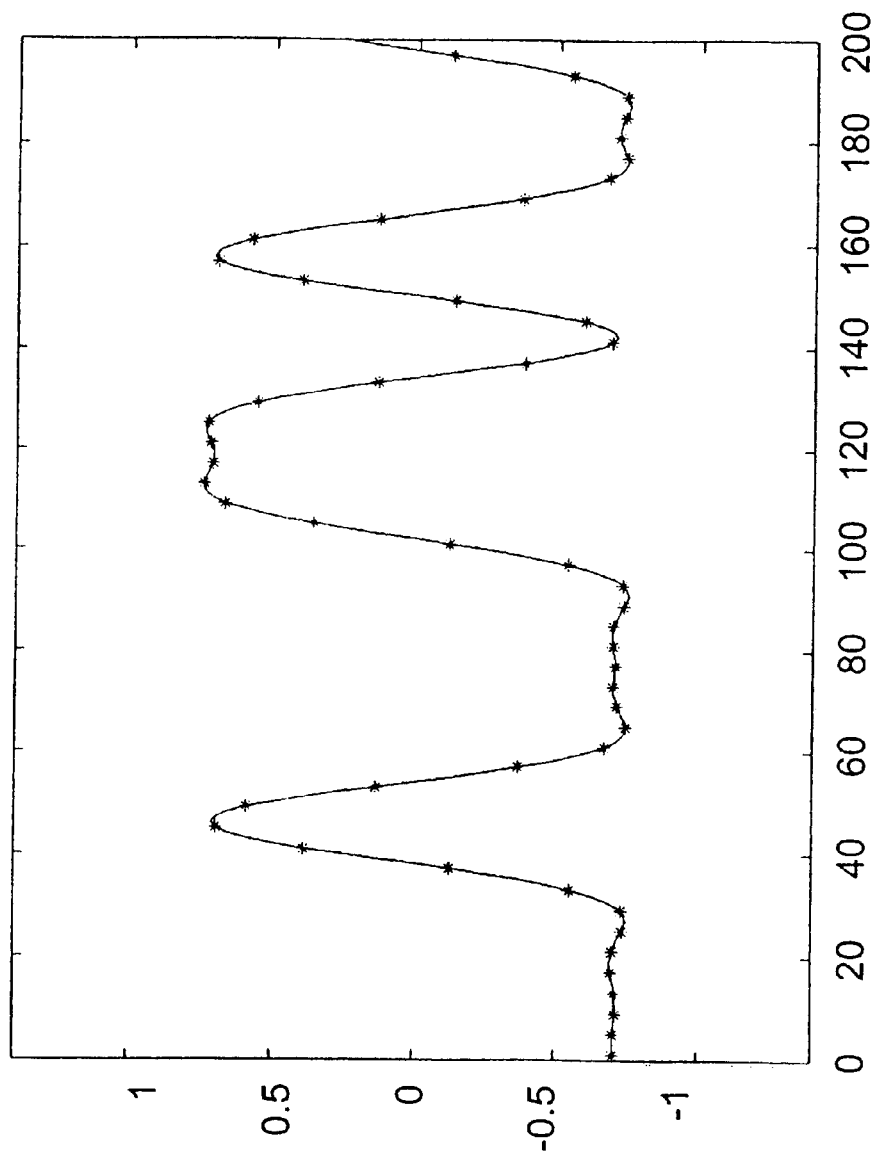
FIG. 1-a is a graph illustrating the difference between an analog signal and the same signal sampled at four samples per symbol.
Figure 1B:
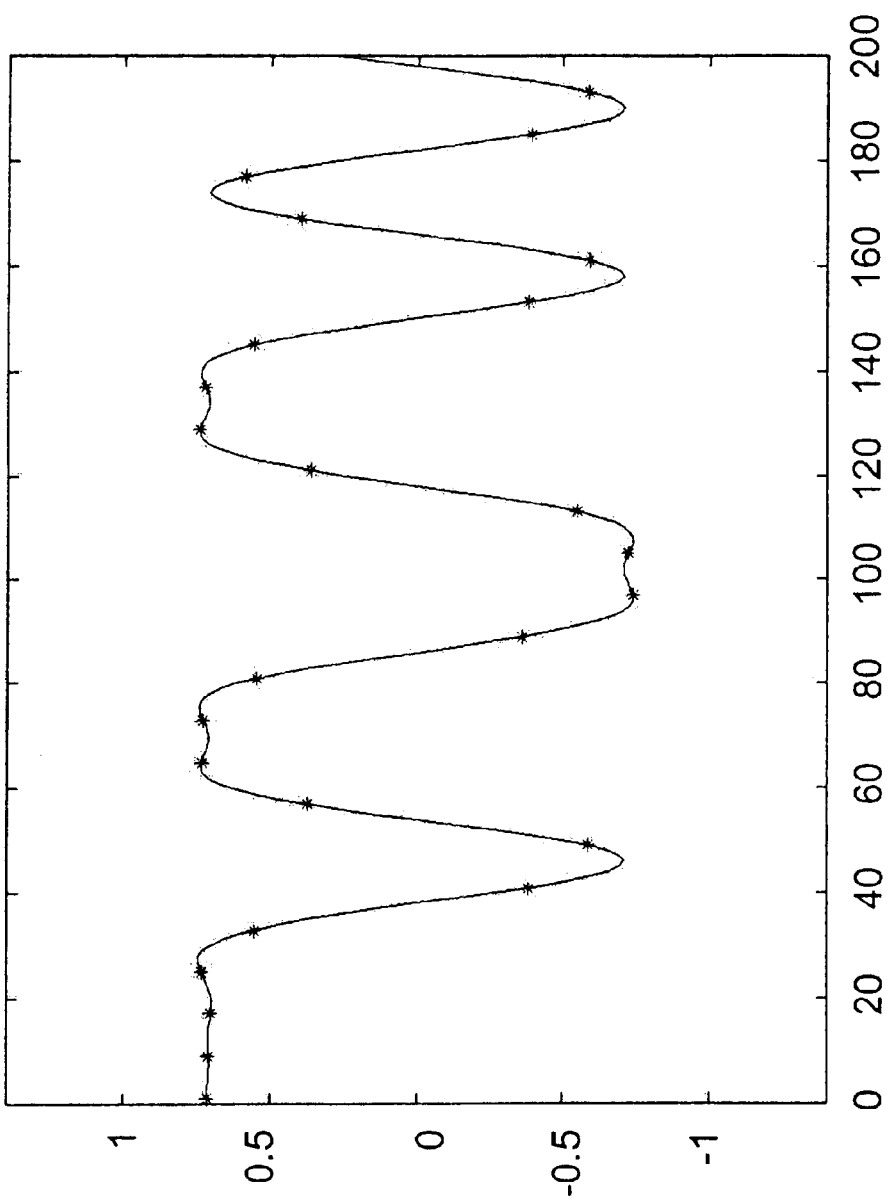

FIGS. 1-a and 1-b illustrate the difference between a continuous time and discrete time representation of a signal for the situation of taking four and two samples per symbol, respectively. The information available about the received signal while sampling at four samples per symbol (FIG. 1-a) is much improved over that while sampling at two samples per symbol (FIG. 1-b). The challenge in using a digital receiver is to provide the same or similar performance with limited information about the received signal as for an analog receiver.

Figure 2A:
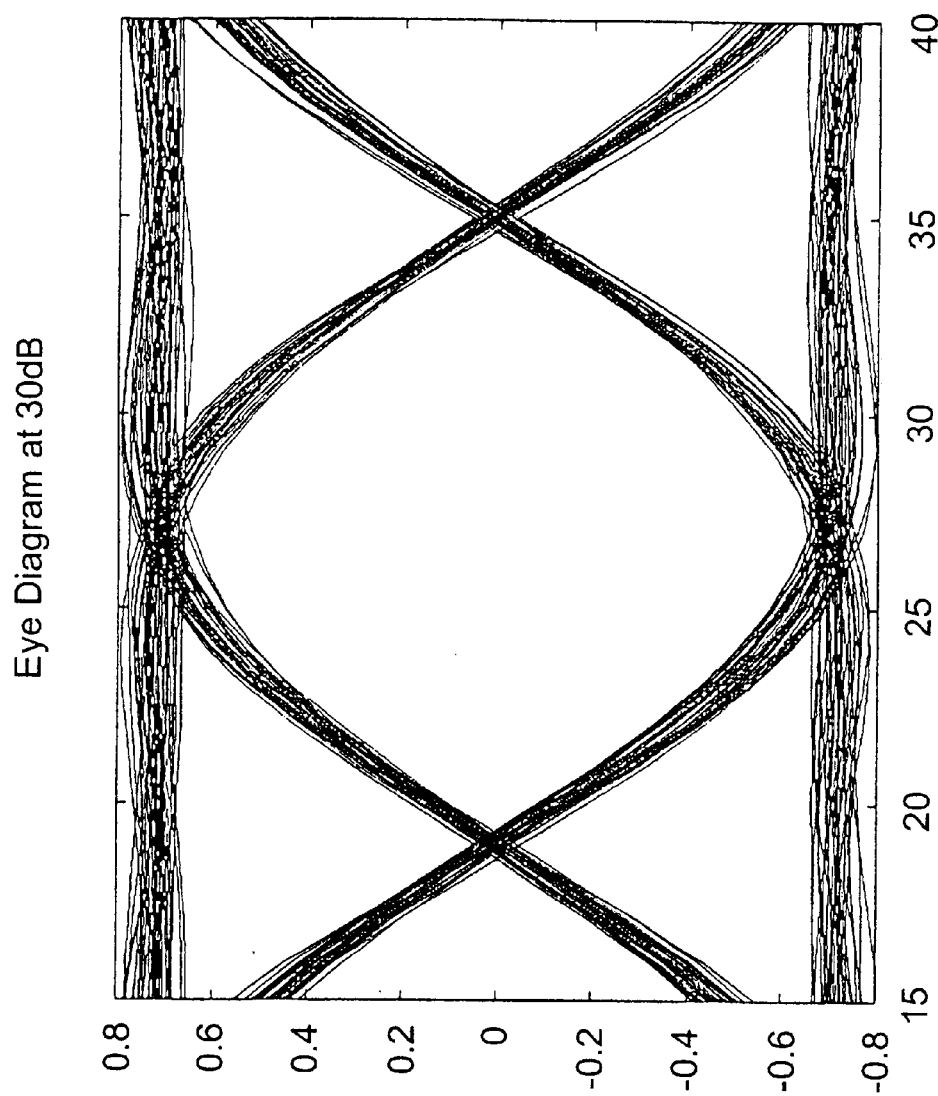
FIG. 2-a is a graph illustrating the formation of an eye pattern at the output of a pulse-shaping filter for high signal to noise conditions.
Figure 2B:
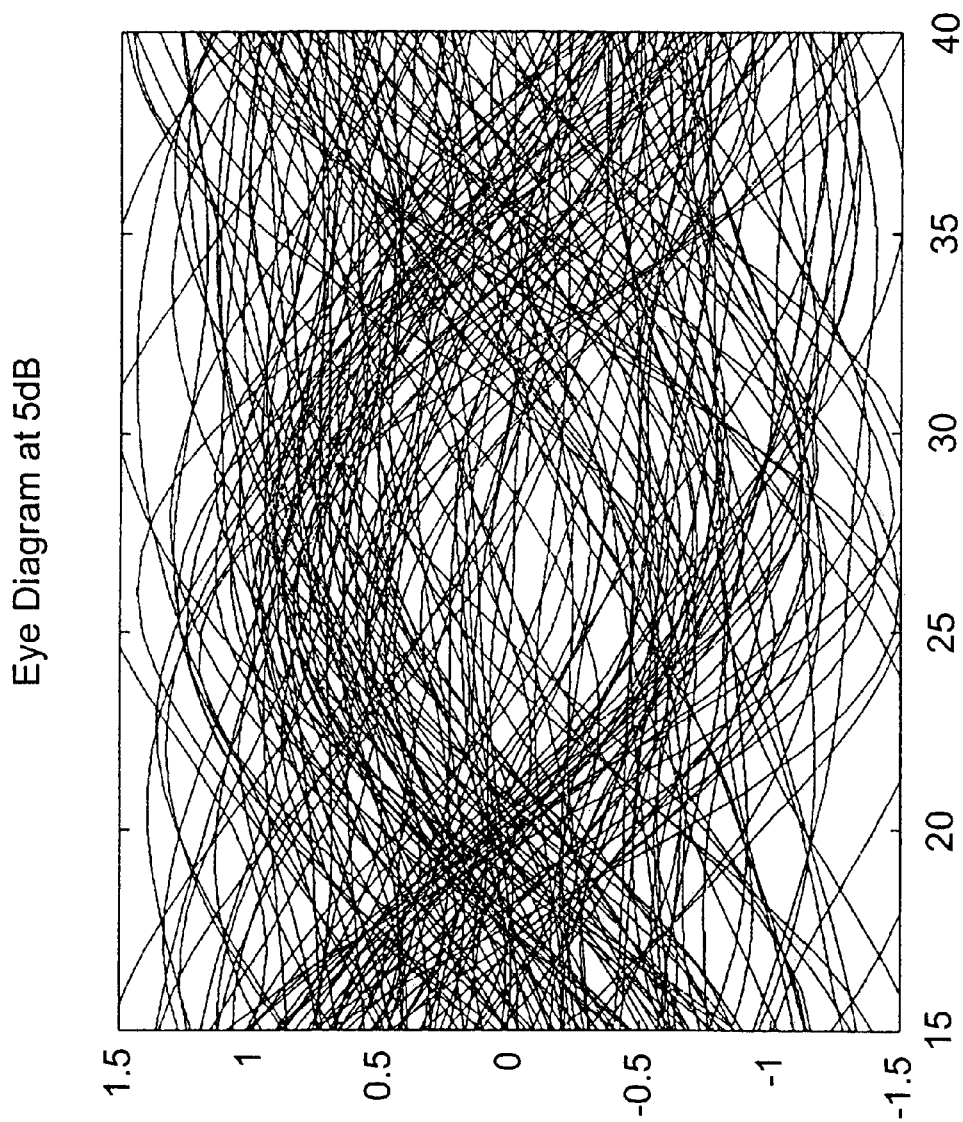

FIGS. 2-a and 2-b illustrate the concept of an eye opening at high (30 dB) and low (5 dB) signal to noise ratios, respectively. Superimposing portions of a signal, equivalent to the duration of one or more symbols, onto itself forms an eye diagram. At high signal to noise conditions there are few fluctuations on the signal so the central portion of the superimposed signal remains clear and tends to form the outline of an eye. This is illustrated in FIG. 2-a at a 30 dB signal-to-noise ratio. FIG. 2-b illustrates how the eye closes at lower signal to noise conditions, e.g., 5 dB, due to fluctuations of the amplitude of the signal.

Figure 3:
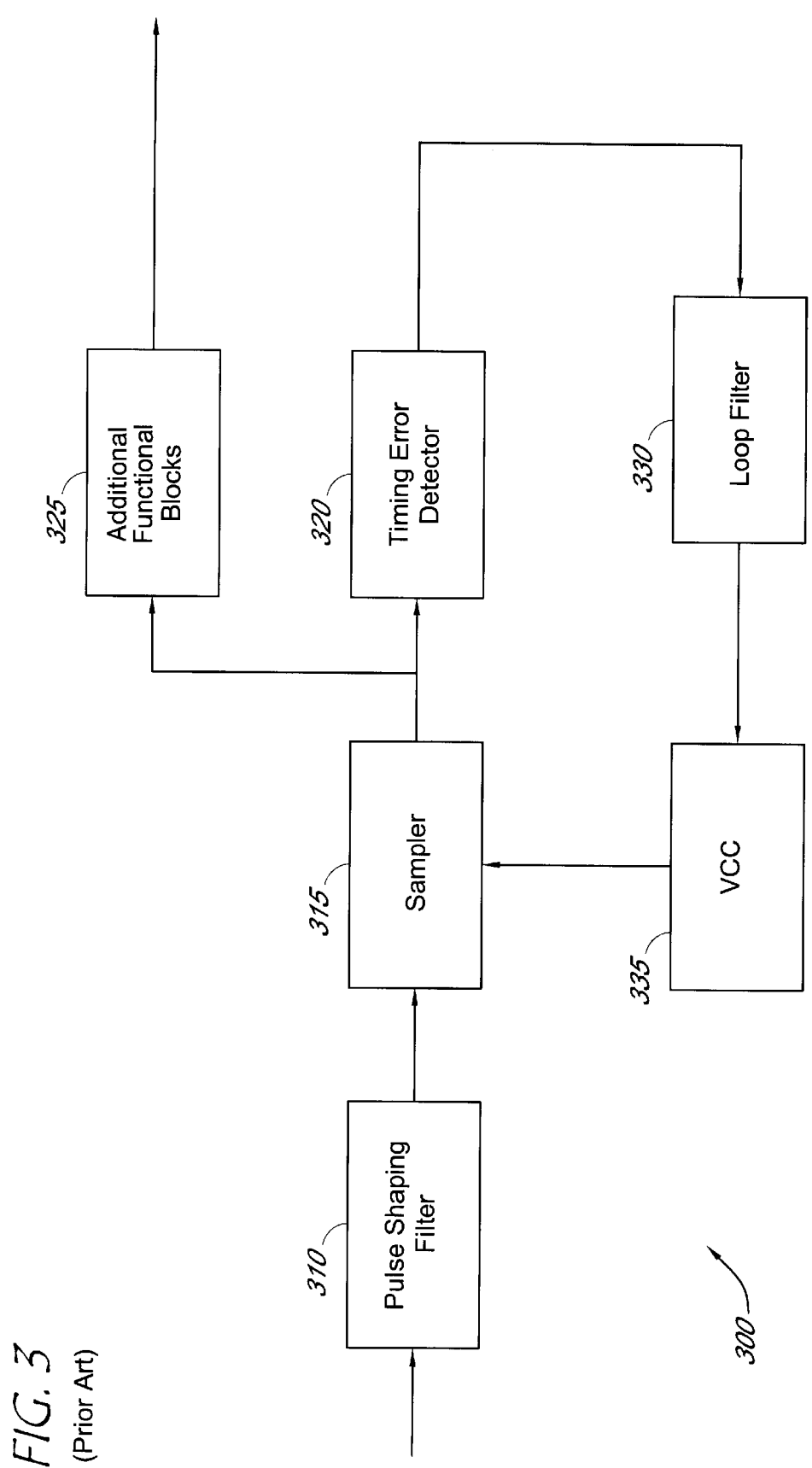
FIG. 3 is a block diagram of a feedback estimator configuration.

Referring now to FIG. 3, a feedback timing estimator configuration 300 will be described. The feedback timing estimator 300 comprises a pulse-shaping filter block 310, a sampler block 315, a timing error detector block 320, additional functional blocks 325, a loop filter 330 and a Voltage Controlled Clock (VCC) 335. The pulse-shaping filter 310 may be either an analog or digital component. The pulse shaping filter output is subsequently fed to the sampling device 315. The phase of the sampling device 315 is controlled by the VCC 335. The sampling rate of the VCC 335 with respect to the data rate depends on the algorithm used in the timing error detector 320. The VCC 335 causes the received signal input to be synchronously sampled. The sampled received signal at the output of the sampling device 315 is fed to the timing error detector 320, which produces an instantaneous error signal based on the sampler output samples. The output of the timing error detector block 320, is fed to the loop filter 330 which averages the instantaneous error signals from the timing error detector 320 to produce a smoothed error response. The longer the averaging interval in the loop filter, the more accurate the timing estimate. This averaged error signal is subsequently fed to the VCC 335 to alter the phase of the sampling clock that samples the continuous received signal at the input of the sampling device 315. The data samples at the output of the sampling device are subsequently fed to additional functional blocks 325 for further processing.

Figure 4:
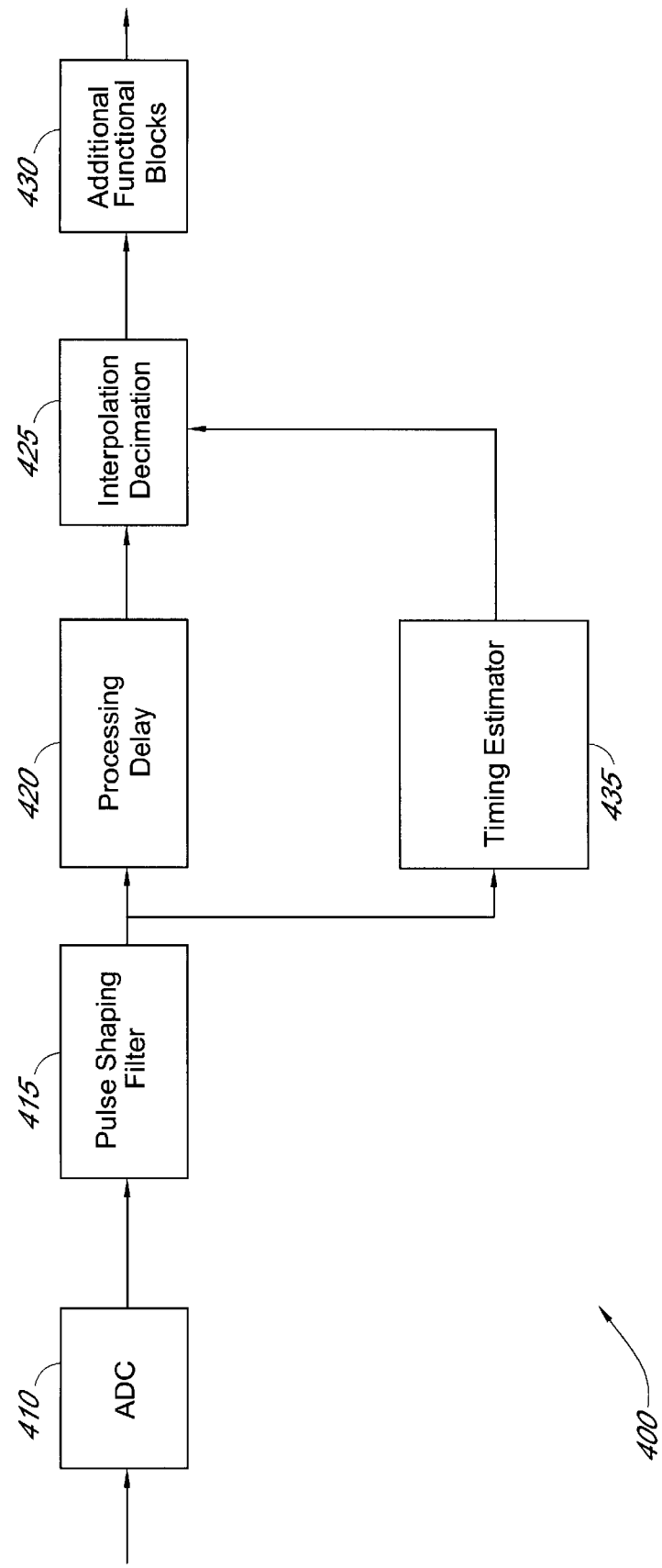
FIG. 4 is a block diagram of a feedforward estimator configuration.

Referring now to FIG. 4, a feedforward timing estimator 400 configuration will be described. The feedforward timing estimator 400 comprises an ADC 410, a pulse shaping filter 415, a processing delay 420, an interpolation/decimation unit 425, additional functional blocks 430 and a timing estimator unit 435. In the feedforward configuration, the first element is the ADC 410 which asynchronous samples the received signal at a rate of two or more samples per symbol. Typically, the sampling rate is four or more samples per symbol. The sampled output signal from the ADC 410 is fed to a digital pulse-shaping filter 415. The data stream from the output of the pulse-shaping filter 415 is fed to the timing estimation unit 435 as well as to a processing delay unit 420, which compensates for the delay in the calculation of the timing offset in the timing estimator unit 435. The timing offset is then fed to the interpolation/decimation unit 425. The interpolation/decimation unit 425 first interpolates the sampled received signal at the instant corresponding to the timing offset. The decimation unit then removes the redundant samples in the decimation unit. The decimated output signal is then fed to additional functional blocks 430 in the receiver.

Figure 5:
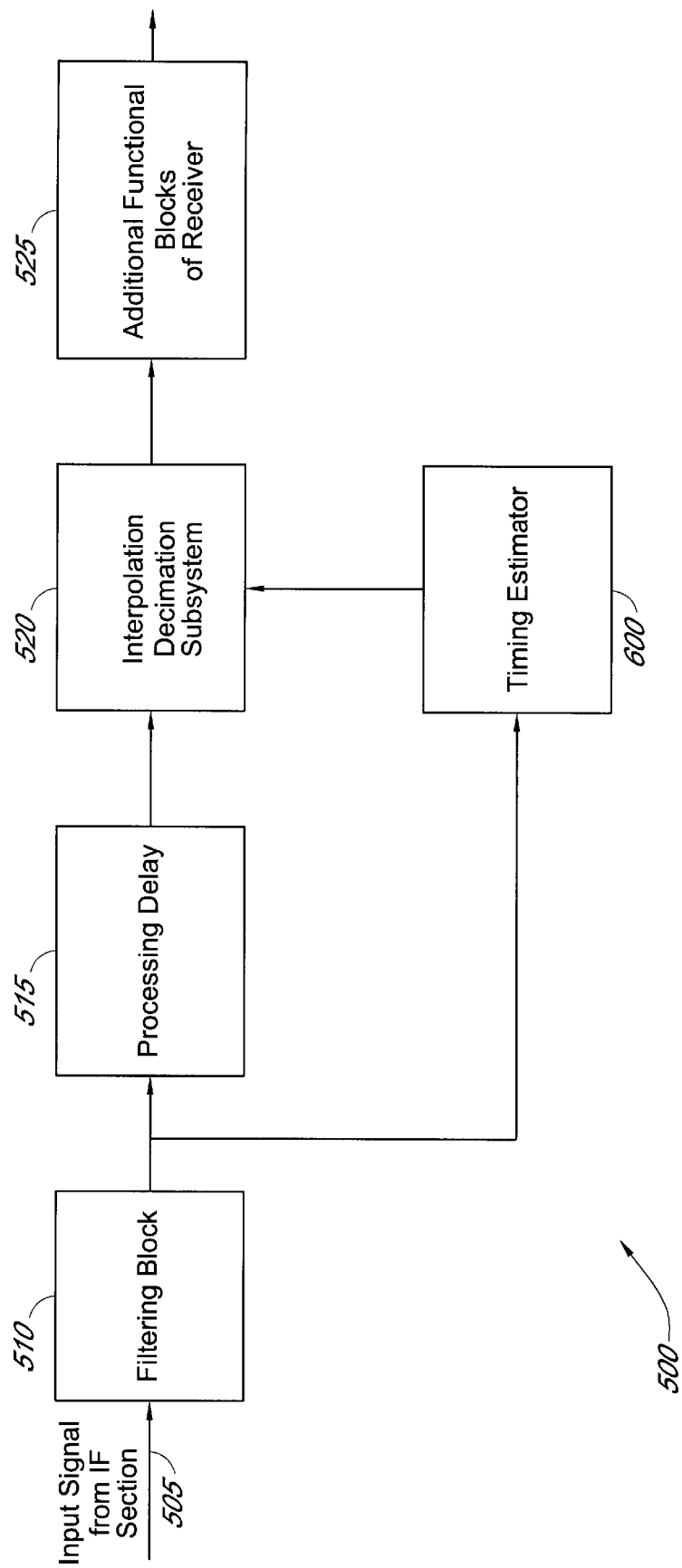
FIG. 5 is a functional block diagram of a digital receiver using the proposed timing estimation method as implemented in one embodiment of the invention.

Referring to FIG. 5, a digital receiver 500 using a timing estimation method will be described. In one embodiment, the digital receiver 500 comprises a filtering subsystem 510, a processing delay compensation module 515, a timing estimation subsystem or estimator 600, an interpolation/decimation subsystem 520 and additional subsystems 525. The filtering subsystem 510 comprises a pulse-shaping filter which receives the data stream 505 from an Intermediate Frequency (IF) subsystem (not shown) of the receiver. This data stream 505 may have already been asynchronously sampled within the IF subsystem. In addition, the IF subsystem may also contain an analog anti-aliasing filter to limit the bandwidth of the received signal.

The sampling rate of the data stream is two samples per symbol, as shown in FIG. 1-b. The sampled data stream 505 is then fed into the pulse-shaping filter within the filtering subsystem 510. The pulse-shaping filter is preferably matched to the pulse-shaping filter used at the transmitter. The pulse-shaping filter provides a Nyquist pulse shape which gives optimal performance in the presence of Additive White Gaussian Noise (AWGN). In other embodiments, the filtering subsystem 510 may also comprise additional components.

The output of the filtering subsystem 510 is then fed into the timing estimation subsystem 600 to estimate the timing offset present on the received sampled signal. The output of the filtering subsystem 510 is also fed to a processing delay 515 which compensates for the delay between the output of the filtering subsystem and the calculation of the timing estimate, which takes place in the estimator 600. The output of the processing delay 515 is fed to an interpolation and decimation subsystem or module 520, which interpolates the samples using the timing estimate from the timing estimator 600. The timing estimate correction unit 520 estimates the data samples corresponding to the estimated timing offset. The estimated data samples are then fed to additional synchronization and functional blocks 525.

Figure 6:
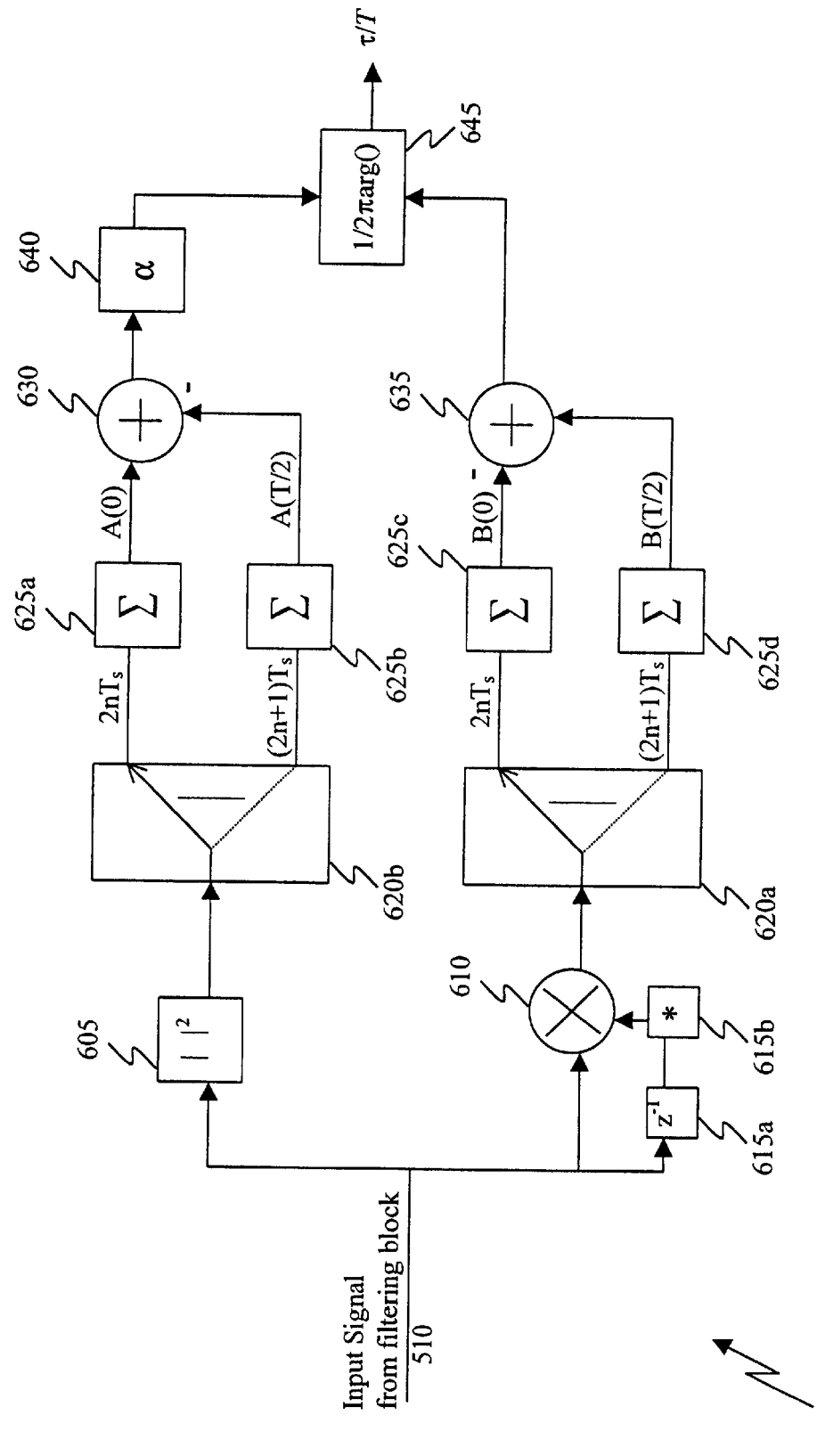
FIG. 6 is a block diagram of the proposed timing estimation subsystem as shown in FIG. 5.

FIG. 6 illustrates a functional block diagram of the timing estimation subsystem 600 used in the digital receiver 500.

The timing estimator 600 comprises a magnitude squarer 605 operator; delay 615a, complex conjugation 615b and multiply 610 operators; two demultiplexers 620a and 620b; four summation units 625a, 625b, 625c and 625d; two subtraction units 630 and 635; a constant gain factor 640; and an angle calculator 645. The angle calculator 645 may be implemented as a look-up table. The inputted data stream from the filtering block 510 is fed into the timing estimation subsystem 600.

The sampled received signal at the output of the pulse-shaping matched filter 510 may be represented as follows:

$$r(mT_s) = \sum_k a_k g(mT_s - kT - \tau)\exp(j\phi) + b(mT_s), \quad \text{Equation 1}$$

where $r(mT_s)$ represents the received signal sampled at time instants $mT_s$ following the pulse-shaping filter, oversampling rate $T_s$ is related to the data symbol rate T as $T_s=T/2$, $a_k$ is the arbitrary transmitted data, $g(t)$ represents the pulse-shaping matched filter, $\tau$ is the timing offset, $b(mT_s)$ represents the filtered sampled AWGN of noise spectral density $N_o$, and $\exp(j\phi)$ represents an exponential phase offset. The baseband received signal is first passed through an anti-aliasing filter in the IF subsystem and then asynchronously sampled. It is known to an engineer in the technology that when the sampling frequency is greater than twice the maximum frequency of a bandlimited signal, the resulting samples contain the same information as the continuous time signal. In one embodiment, the received signal is sampled at two samples per symbol such that $T_s=T/2$.

The filtered received data stream 510 is fed into two nonlinearities. The first is a magnitude squarer operator 605 and the second nonlinearity is a delay 615a, complex conjugation 615b and multiply 610 operations subsystem. In one embodiment, a magnitude square nonlinearity and a delay, complex conjugation and multiply nonlinearity are used. However, other nonlinearities or combinations of nonlinearities may also be used. The advantage of using a magnitude square or delay, complex conjugation and multiply nonlinearity is that any phase offset, which may have been present on the received signal, is removed at its output. Therefore, this estimator 600 can be used in the presence of a phase offset on the received signal.

The average value of the received signal defined in Equation 1 at the output of a magnitude squaring nonlinearity is a cyclostationary process A $(mT_s)$, which is exploited to estimate the timing offset. A cyclostationary process implies $A(0)=A(mT_s)$, $A(T/2)=A((2m+1)T_s/2)$ for all values of m. A cyclostationary process generates spectral lines in the frequency domain. However, due to the pulse-shaping filter, only those terms at 1/T and 1/T and the energy component at DC (zero Hertz) are relevant to timing estimation. Evaluating $A(mT_s)$ at two samples per symbol at $mT_s=0$ and $mT_s=T/2$ gives, $$A(0) = \frac{1}{T}\left[c_0 + 2c_1\cos\left(\frac{2\pi\tau}{T}\right)\right] \quad \text{Equation 2}$$

$$A\left(\frac{T}{2}\right) = \frac{1}{T}\left[c_0 - 2c_1\cos\left(\frac{2\pi\tau}{T}\right)\right],$$

where $c_0$ is the energy component at DC (i.e., zero Hertz) and $c_1$ is the energy of the pulse shaping filter $g(t)$ when overlapped with a symbol rate shifted replica of itself as shown in Equation 3 as follows:

$$c_0 = \int_{-\infty}^{\infty} G^2(f) df \qquad \text{Equation 3}$$

$$c_1 = \int_{-\infty}^{\infty} G\left(f + \frac{1}{2T}\right) G\left(f - \frac{1}{2T}\right) df = \frac{\beta T}{8}$$

Expansion of the $c_1$ term gives $\beta T/8$ for the case of a raised cosine filter, where $\beta$ is the roll-off factor which takes on values in the range [0,1].

From Equation 2, an expression for the Cosine function of the timing offset is generated. However, an expression for the Sine function of the timing offset is necessary to isolate an expression for the timing offset. A suitable nonlinearity is a unit delay, complex conjugation and multiply operation as illustrated at blocks 615a, 615b and 610. The output of this nonlinearity is also a cyclostationary process $B(mT_s)$. The sampled average values from the delay 615a, complex conjugation 615b and multiply unit 610 at mTs=0 and mTs=T/2, at the output of the summation blocks 625c and 625d, are:

$$B(0) = \frac{1}{T}\left[c_0 - 2c_2 \sin\left(\frac{2\pi\tau}{T}\right)\right] \qquad \text{Equation 4}$$

$$B\left(\frac{T}{2}\right) = \frac{1}{T}\left[c_0 + 2c_2 \sin\left(\frac{2\pi\tau}{T}\right)\right],$$

Where $c_2$ is $$c_2 = \int_{-\infty}^{\infty} G\left(f + \frac{1}{2T}\right) G\left(f - \frac{1}{2T}\right) \cos(\pi f T) df, \qquad \text{Equation 5}$$

And G(f) is the Fourier transform of the pulse shape g(t) in Equation 1. Expansion of $c_2$ in Equation 5 gives a value very close to $c_1$, where the approximation $c_1 = \alpha c_2$ is appropriate if $\alpha$ is chosen to be a value very close to one (1). Note that A(0), A(T/2), B(0) and B(T/2) are four equations with the timing offset being the unknown parameter.

The next stage in the timing estimator 600 is to average the instantaneous values at the outputs of both the square-law nonlinearity 605 and the delay 615a, complex conjugation 615b and multiply nonlinearity 610, to form A(0), A(T/2), B(0) and B(T/2). However, this first requires isolating the even and odd samples from both nonlinearities to form the expressions for A(0), A(T/2), B(0) and B(T/2). The even samples at the output of the two nonlinearities are those corresponding to $mT_s=nT$ where n is an integer and the odd samples are those at $mT_s=nT+T/2$. The demultiplexers in blocks 620a and 620b isolate the even and odd samples from both nonlinearities and are controlled using the sampling clock.

The samples are then averaged over the observation interval to estimate A(0), A (T/2), B(0) and B(T/2) as illustrated at blocks 625a, 625b, 625c and 625d. Equation 2 and Equation 4 can now be solved as four simultaneous equations with two unknowns, namely $\cos(2\pi\tau/T)$ and $\sin(2\pi\tau/T)$.

The $\cos(2\pi\tau/T)$ term is formed as the difference of A(0) and A(T/2) as can be noted by examining Equation 2. The $\sin(2\pi\tau/T)$ term is formed as the difference of B(T/2) and B(0) as can be seen by examining Equation 4. The $\cos(2\pi\tau/T)$ term is formed at subtraction unit 630 and the $\sin(2\pi\tau/T)$ term is formed at subtraction unit 635. Calculating the angle formed by the complex components derived at units 630 and 635 gives an expression for the timing offset. The timing estimate is formed as follows:

$$\frac{\hat{\tau}}{T} = \frac{1}{2\pi} \arg\left[\alpha\left(A(0) - A\left(\frac{T}{2}\right)\right) + j\left(B\left(\frac{T}{2}\right) - B(0)\right)\right] \qquad \text{Equation 6}$$

Where $\alpha$ is a gain factor of value close to unity, which is ideally $c_1/c_2$. The estimator 600 thus provides immunity to the effect of phase offsets on the input signal. This gives a designer much more flexibility in the design of an all digital receiver.

The advantage of the estimator is especially apparent for digital communication systems having high data rates. In such systems, oversampling the received signal at more than two samples per symbol may not always be possible or desirable ( Tayebi et al., "Wireless Multimedia Carrier System, " U.S. patent application Ser. No. 08/954,217, filed Oct. 20, 1997). The estimator of the present invention uses a similar approach (i.e., feedforward design with asynchronous sampling) as used for an alternative algorithm in the literature. The known algorithm requires a minimum oversampling rate of four samples per symbol (H. Meyr, M. Moeneclaey and S. A. Fechtel, "*Digital Communication Receivers: Synchronization, Channel Estimation and Signal Processing,*" John Wiley Publishers, pp. 289–295, 1998). However, with the addition of a delay, complex conjugation and multiply nonlinearities, the present estimator avoids the requirement of having a minimum oversampling rate of four samples per symbol. Yet even with reduced sampling, the estimator is immune to the presence of a slowly varying phase offset over the observation interval.

While the above detailed description has shown; described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A method of feedforward timing estimation for use in a digital receiver within a communication system, the method comprising:

splitting an input data stream into a first data stream and a second data stream;

applying a first nonlinearity to the first data stream and a second nonlinearity to the second data stream;

averaging the instantaneous values of the first nonlinearly derived data stream, comprising:

isolating even and odd samples from the first nonlinearly derived data stream, averaging the even samples over an observation interval, averaging the odd samples over an observation interval, and determining the difference between the averaged even samples and the averaged odd samples;

averaging the instantaneous values of the second nonlinearly derived data stream, comprising:

isolating even and odd samples from the second nonlinearly derived data stream, averaging the even samples over an observation interval, averaging the odd samples over an observation interval, and determining the difference between the averaged even samples and the averaged odd samples; and determining a timing offset as a function of the complex components of the average instantaneous values.

2. The method defined in claim 1, additionally comprising pulse-shape filtering the input data stream.

3. The method defined in claim 1, additionally comprising sampling the input data stream at a minimum rate of two samples per symbol.

4. The method defined in claim 3, wherein the isolating includes demultiplexing the nonlinearly derived data stream into even and odd samples.

5. The method defined in claim 1, wherein the first nonlinearity comprises a square-law nonlinearity.

6. The method defined in claim 1, wherein the second nonlinearity comprises a delay and multiply nonlinearity.

7. The method defined in claim 1, wherein the function is defined by $$\frac{T}{2\pi}\arg\left(\alpha\left(A(0)-A\left(\frac{T}{2}\right)\right)+j\left(B\left(\frac{T}{2}\right)-B(0)\right)\right),$$

where T is a data symbol rate, arg (argument) is a phase calculator function, $\alpha$ is a gain factor, A is a sampled cyclostationary process where A(0) represents the even samples and A(T/2) represents the odd samples (the difference $$A(0)-A\left(\frac{T}{2}\right)$$

represents a cosine function), and B is a sampled cyclostationary process of a unit delay complex conjugation and multiply operation where B(0) represents the even samples and B(T/2) represents the odd samples (the difference $$B\left(\frac{T}{2}\right)-B(0)$$

represents a sine function).

8. A feedforward timing estimation system for use in a digital receiver within a communication system, the timing estimation system comprising:
 a pulse-shaping filter receiving a data stream sampled at a minimum rate of two samples per symbol;
 a timing estimator, receiving the filtered data stream, and being capable of generating a timing offset, comprising a first nonlinearity circuit and a second nonlinearity circuit, a first demultiplexer receivably connected to the first nonlinearity circuit, and a second demultiplexer receivably connected to the second nonlinearity circuit;
 a processing delay, receiving the filtered data stream, and delaying the filtered data stream; and
 a timing correction subsystem, receiving the delayed data stream and the timing offset, and being capable of generating corrected data samples according to the timing offset.

9. The timing estimation system defined in claim 8, wherein the timing correction subsystem comprises an interpolation circuit receivably connected to the processing delay, and a decimation circuit receivably connected to the interpolation circuit.

10. The timing estimation system defined in claim 8, wherein each demultiplexer demultiplexes the output of its corresponding nonlinearity circuit into even and odd samples.

11. The timing estimation system defined in claim 10, wherein the timing estimator further comprises a first even summation unit and a first odd summation unit receivably connected to the first demultiplexer, and a second even summation unit and a second odd summation unit receivably connected to the second demultiplexer, each summation unit averaging the received samples over an observation interval.

12. The timing estimation system defined in claim 11, wherein the timing estimator further comprises a first subtractor unit determining the difference between the output of the first even summation unit and the first odd summation unit, and a second subtractor unit determining the difference between the output of the second even summation unit and the second odd summation unit, wherein each subtractor unit outputs a set of complex components.

13. The timing estimation system defined in claim 12, wherein the timing estimator further comprises a timing offset calculator receivably connected to the first subtractor unit and the second subtractor unit, wherein the timing offset is determined as a function of the complex components output by the first and second subtractor units.

14. A method of feedforward timing estimation for use in a digital receiver within a communication system, the method comprising:
 splitting an input data stream into a first data stream and a second data stream;
 applying a first nonlinearity to the first data stream and a second nonlinearity to the second data stream;
 averaging the instantaneous values of the first nonlinearly derived data stream;
 averaging the instantaneous values of the second nonlinearly derived data stream; and
 determining a timing offset as a function of the complex components of the averaged instantaneous values, wherein the function is defined by $$\frac{T}{2\pi}\arg\left(\alpha\left(A(0)-A\left(\frac{T}{2}\right)\right)+j\left(B\left(\frac{T}{2}\right)-B(0)\right)\right),$$

where T is a data symbol rate, arg (argument) is a phase calculator function, $\alpha$ is a gain factor, A is a sampled cyclostationary process where A(0) represents the even samples and A(T2) represents the odd samples (the difference $$A(0)-A\left(\frac{T}{2}\right)$$

represents a cosine function), and B is a sampled cyclostationary process of a unit delay complex conjugation and multiply operation where B(0) represents the even samples and B(T/2) represents the odd samples (the difference $$B\left(\frac{T}{2}\right)-B(0)$$

represents a sine function).

15. A feedforward timing estimation system for use in a digital receiver within a communication system, the timing estimation system comprising:
 a pulse-shaping filter receiving a data stream sampled at a minimum rate of two samples per symbol;

a timing estimator, receiving the filtered data stream, and being capable of generating a timing offset, comprising:
- a first nonlinearity circuit and a second nonlinearity circuit,
- a first demultiplexer receivably connected to the first nonlinearity circuit and a second demultiplexer receivably connected to the second nonlinearity circuit, wherein each demultiplexer demultiplexes the output of its corresponding nonlinearity circuit into even and odd samples, and
- a first even summation unit and a first odd summation unit receivably connected to the first demultiplexer, and a second even summation unit and a second odd summation unit receivably connected to the second demultiplexer, each summation unit averaging the received samples over an observation interval;

a processing delay, receiving the filtered data stream, and delaying the filtered data stream; and a timing correction subsystem, receiving the delayed data stream and the timing offset, and being capable of generating corrected data samples according to the timing offset.

16. The timing estimation system defined in claim 15, wherein the timing estimator further comprises a first subtractor unit determining the difference between the output of the first even summation unit and the first odd summation unit, and a second subtractor unit determining the difference between the output of the second even summation unit and the second odd summation unit, wherein each subtractor unit outputs a set of complex components.

17. The timing estimation system defined in claim 16, wherein the timing estimator further comprises a timing offset calculator receivably connected to the first subtractor unit and the second subtractor unit, wherein the timing offset is determined as a function of the complex components output by the first and second subtractor units.

* * * * *